United States Patent [19]

Michels et al.

[11] 4,017,673
[45] Apr. 12, 1977

[54] METHOD AND APPARATUS FOR GRAPHITIZATION OF CARBON MATERIALS

[75] Inventors: Martin Michels, Kuhlenthal; Wilhelm Settele, Biberbach, both of Germany

[73] Assignee: Sigri Elektrographit GmbH, Meitingen near Augsburg, Germany

[22] Filed: Oct. 20, 1975

[21] Appl. No.: 624,273

[30] Foreign Application Priority Data

Dec. 17, 1974 Germany ............................ 2459576

[52] U.S. Cl. ........................................ 13/7; 219/283
[51] Int. Cl.² ........................ F27D 11/04; F27B 9/00
[58] Field of Search ................. 13/20, 23, 7, 34; 219/283, 288

[56] References Cited

UNITED STATES PATENTS 2,621,218  12/1952  Juckniess ............................ 13/7
3,429,974  2/1969  Watson et al. ....................... 13/20

Primary Examiner—R. N. Envall, Jr.
Attorney, Agent, or Firm—Herbert L. Lerner

[57] ABSTRACT

Continuous-type furnace for the graphitization of carbon bodies having a preheat zone, a cooling zone and a heating zone provided with an electric heating device, through which furnace the carbon bodies are cyclically transported either as a single body or in groups and are deposited between cycles on holding devices which are connected to the furnace. The motion in the direction of the length of the furnace is effected by gripping devices which reach into the furnace periodically. Graphitization of carbon bodies with considerable reduction of the energy requirements are achieved.

12 Claims, 7 Drawing Figures

METHOD AND APPARATUS FOR GRAPHITIZATION OF CARBON MATERIALS

BACKGROUND OF THE INVENTION

1. Field of the Invention

This invention relates to the production of artificial graphite and more particularly to a new and improved method and apparatus for graphitizing carbon bodies to artificial graphite.

2. Description of the Prior Art

Artificial graphite is made by heating amorphous carbon at high temperature converting the carbon to graphite which is a crystalline form of carbon. The source of carbon may be coal, but is preferably derived from petroleum in the form of petroleum coke which carbon after preheating to a temperature of above about 700° C to 1200° C up to about 2000° C is then further heated above about 2200° C to a temperature of nearly 3000° C and retained at the high temperature for a sufficient time for the formation of the hexagonal crystal pattern. The thermal conductivity of graphite is higher than carbon and this combined with a low coefficient of thermal expansion gives it high resistance to shock. Although carbon and graphite are extensively used in electrical applications, graphite, despite its high cost, is usually selected as anodes for electrical applications because of higher purity, higher electrical conductivity, greater ease of machining and high oxidation resistance.

Discontinuously operated furnaces for graphitization of carbon bodies are known in the art as illustrated by the Acheson furnace and consist basically of two graphite electrodes which are disposed in the end walls of the furnace, between which electrodes the bodies to be graphitized are layered between granular resistance and isolation material. In order to heat the carbon bodies, the graphite electrodes which are short-circuited by the furnace content, are electrically connected to a current source, whereby the generated Joule's heat causes a rise of the furnace temperature to 2200° up to approximately 3000° C. Depending on the size of the furnace, the period of time required to heat up the furnace is approximately 1 – 3 days and the following cooling period is approximately 5 – 12 days.

The Acheson process has serious disadvantages: The operating cycle of the furnace involving long heating and longer cooling time periods retards and complicates the flow of material, particularly with respect to the great effort required for charging and discharging the furnaces. The large amounts of resistance and isolation materials used in the process require special transport as well as sorting and cleaning devices. The carbon bodies have to be stratified with great care to avoid resistance losses, without fully eliminating localized resistance variations and the resulting temperature peaks during the heating up period which deteriorate the quality of the graphite bodies. Finally, the efficiency of the Acheson method is comparatively low because in addition to the graphite bodies, a large quantity of resistance material is also heated up to the graphitization temperature and only a small part of the thermal energy supplied is recovered. Further disadvantages of this method are the difficulties to contain and discharge the poisonous gases which are generated during graphitization, for example, sulfur dioxide and carbon monoxide. Also resistor material becomes attached to the graphite bodies and the former has to be removed by grinding or other mechanized operations.

A continuous graphitization method has been suggested whereby the carbon bodies are continuously moved through a furnace which is provided with a heating device and the required energy is indirectly transferred to the bodies by heat radiation or inductive coupling. U.S. Pat. No. 1,884,600 discloses a graphitization furnace with a preheating zone heated by induction heat, a graphitization zone in which are disposed one or several induction coils and a cooling zone. Japanese Pat. No. 53 882 164 discloses a graphitization method in which the carbon body is pushed through a graphite tube heated by direct resistance heating to the graphitization temperature with an inert gas passing through the tube in counter flow to the carbon body.

The known continuous graphitization method have some advantages over the Acheson method, i.e. lesser requirements for personnel and energy, improved material handling and fewer quality variations of the produced graphite. The disadvantages are material and are in the case of induction heating the matching of diameters, respectively shape of the coils to the diameters and cross-sections of the carbon bodies, which matching is required for suitable induction coupling and also the difficulty of protecting the induction coils against overheating and attack from corrosion causing gases. As a result the graphitization of carbon bodies of different cross-sections and shapes is made quite difficult and sometimes even impossible. In some methods wherein the bodies are graphitized with indirect resistance heating, the heating tube has a limited lifetime due to evaporation because of the relative high evaporation pressure under graphitization conditions. Finally, in furnaces with horizontally arranged heating channels, particularly used for graphitization of larger carbon bodies, rollers or similar means to reduce sliding friction and wear of the channel walls must be provided which latter means have a high failure rate at the high graphitization temperature thereby greatly reducing the efficiency of continuously operated furnaces constructed according to the known state of the art.

SUMMARY OF THE INVENTION

An object of the present invention to provide an efficient method of cyclic operation for the graphitization of carbon bodies, which method is particularly adapted to the graphitization of large bodies of a great variety of shapes. A further object of the invention is to provide a continuous-type furnace with an improved operational lifetime to carry out the graphitization process.

In accordance with the present invention a method of cyclic operation for graphitization of carbon bodies in a continuous-type furnace comprises transporting a charge of carbon containing at least one carbon body to be graphitized into a preheating zone of said furnace wherein said charge of carbon is retained by a holding device in said preheating zone and passing a hot inert gas in contact with said carbon charge, transporting said preheated carbon to a graphitization zone in said furnace wherein said preheated carbon is retained in said graphitization zone by holding device in said zone and heating said preheated carbon by electrical heating means up to a temperature above 2200° C in said graphitization zone to effect graphitization of preheated carbon, transporting said graphitized carbon to a cooling zone in said furnace wherein said graphitized carbon is retained in said cooling zone by a holding device in said zone and cooled in said cooling zone to a temperature below about 500° C, said preheating, graphitization and cooling of said carbon body constituting a cycle of operation, simultaneously subjecting in furnace said carbon charge to preheating, another previously preheated carbon body to graphitization, and a third previously preheated and graphitized carbon body to cooling, and after each cycle removing the cooled graphite body from the holding device in the cooling zone and transporting it out of the cooling zone, removing the graphitized body from the holding device in the graphitizing zone and transporting it to the cooling zone, removing the preheated carbon from the holding device in the preheating zone and transporting it to the graphitizing zone, transporting a new charge of carbon into the preheating zone, and continuing the simultaneous preheating, graphitization and cooling of three different carbon charges and between cycles moving the carbon bodies from the holding devices and transporting the graphite carbon out of the cooling zone, transporting the graphitized carbon to the cooling zone, transporting the preheated carbon to the graphitization zone, and transporting a new charge to the preheating zone.

Effective preheating of the carbon charge to the process and cooling of the graphitized carbon with good thermal efficiency is accomplished by passing a cool inert gas in direct contact with the graphitized carbon in the cooling zone countercurrent to the direction of the transport of said graphitized carbon, then passing the heated gas from the cooling zone through a passageway in said graphitization zone out of contact with the carbon body therein, and then passing the hot inert gas from the graphitization zone into said preheating zone in direct contact with the carbon charge in the preheating zone countercurrent to the direction of transport of said carbon change thereby preheating said carbon charge.

The gas used to preheat the carbon charge may be recycled to the cooling zone but desirably, contaminents, particularly sulfur compounds, should be removed. This is accomplished by discharging gas from said preheating zone, removing gaseous sulfur compounds as impurities from said discharged gas, and returning the purified gas to the cooling zone.

In a preferred embodiment the carbon bodies in the graphitization zone are held by two holding devices each, which are constructed as contact pieces and are connected with an electric current supply.

The carbon bodies are cyclically transported in units, each unit containing a single carbon body or a group of carbon bodies through a continuous-type furnace and are deposited between cycles on holding devices which are in fixed connection with the furnace.

Apparatus for carrying out the method according to the present invention is a continuous-type furnace provided with a preheating zone, a graphitization zone with an electric heating device, a cooling zone and devices for feeding and discharging of inert gas and combustion gas with at least one furnace wall provided with holding devices and slot-shaped openings and with gripping devices arranged outside of the furnace, periodically acting through said openings, and moving the carbon bodies in horizontal and vertical direction.

A continuous-type furnace for graphitization of carbon bodies comprising a channel in said furnace through which a carbon body for graphitization may pass consecutively through a preheating zone, a graphitization zone and a cooling zone, holding means in each said zones for retaining carbon body in said preheating zone, electrical heating means in said graphitization zone for graphitizing said carbon body, cooling means in said cooling zone for cooling said graphitized body, slot-shaped openings in said furnace, gripping devices extending through said slot-shaped openings into said zones in said furnace channel for gripping said carbon bodies in said zones and extending outside said channel, means connected to said gripping devices outside said channel to move the carbon bodies in said zones in horizontal and vertical directions.

In an embodiment of the furnace, the cooling zone has an inlet opening for the introduction of cool inert gas in direct contact with the carbon bodies therein, an outlet opening for the discharge of the thus heated inert gas from the cooling zone into the graphitization zone, a passageway in said graphitization zone through which said gas passes out of contact with the carbon bodies therein an outlet opening in said graphitization zone for the discharge of said gas into said preheating zone wherein it passes in direct contact with the carbon bodies therein, and an outlet opening in said preheating zone for the discharge of said gas.

The graphitization zone is a chamber which can be closed by graphite sliding members across the direction of the movement of the carbon bodies. The holding devices which are connected with the furnace wall are constructed as contact pieces which are electrically connected to a current supply. In an advantageous embodiment of the invention, a second channel is disposed under the furnace channel and is connected with it by a slot which extends over the total length of the furnace and in the slot there is disposed a series of carriages that are movable on rails and equipped with vertically movable platforms or gripping devices whereby the platforms engage in the slot between the furnace channel and the second channel and seal the latter from the furnace channel. According to a further embodiment, the preheat zone contains one or several heating devices. Also, it is of advantage to arrange the preheat and cooling zone parallel to each other, whereby both zones are disposed in the furnace channel adjacent to each other.

DESCRIPTION OF THE DRAWING

Other features which are considered as characteristic for the invention are set forth in the appended claims.

Although the invention is illustrated and described herein as method and apparatus for graphitization of carbon bodies in a continuous-type furnace, it is nevertheless not intended to be limited to the details shown, since various modifications may be made therein without departing from the spirit of the invention and within the scope and range of equivalents of the claims.

Figure 1:
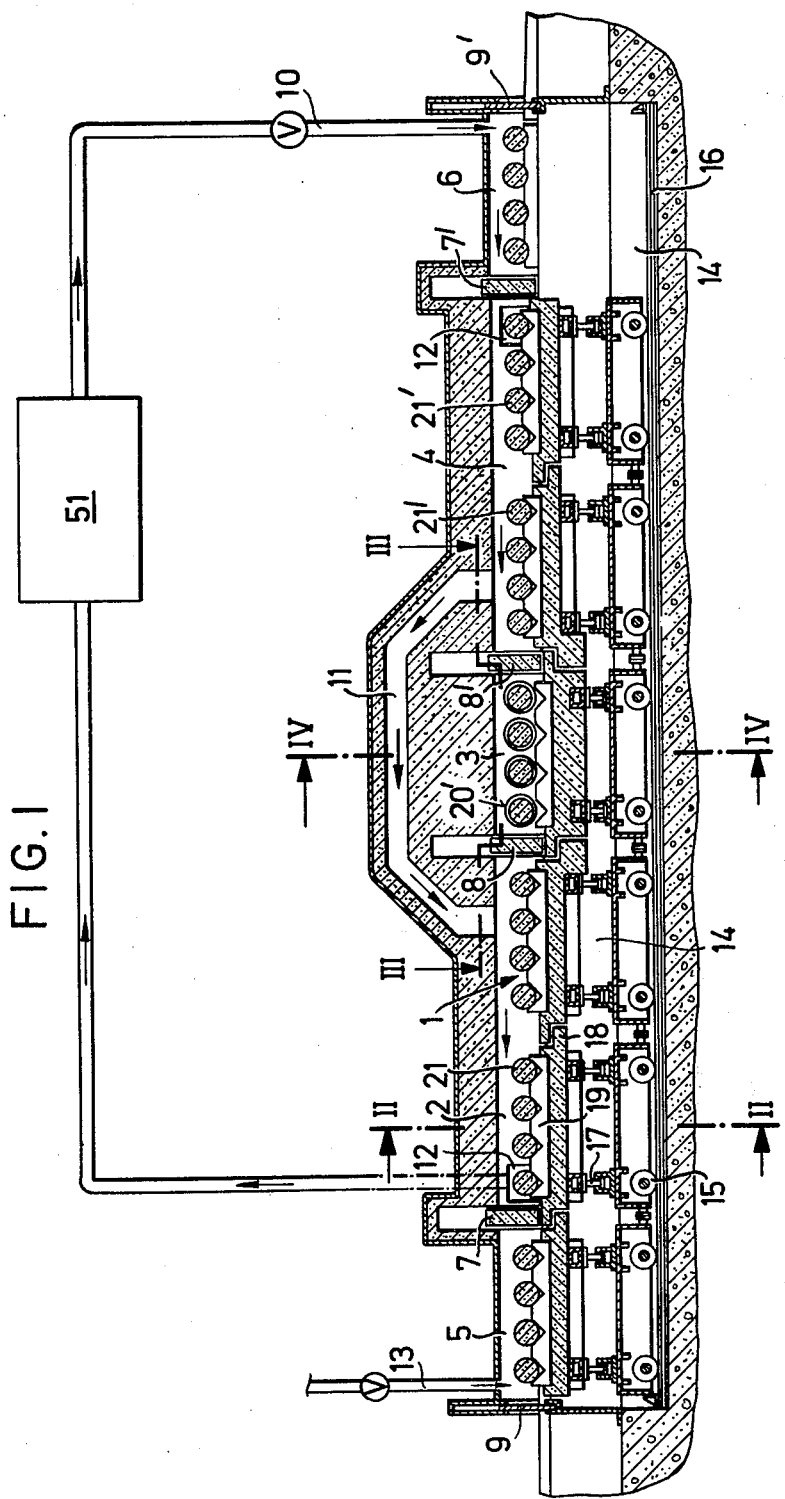

The invention, however, together with additional objects and advantages thereof will be best understood from the following description when read in connection with the accompanying drawings, in which:

FIG. 1 is a graphitization furnace with its functional zones arranged in series, shown in longitudinal section.

Figure 2:
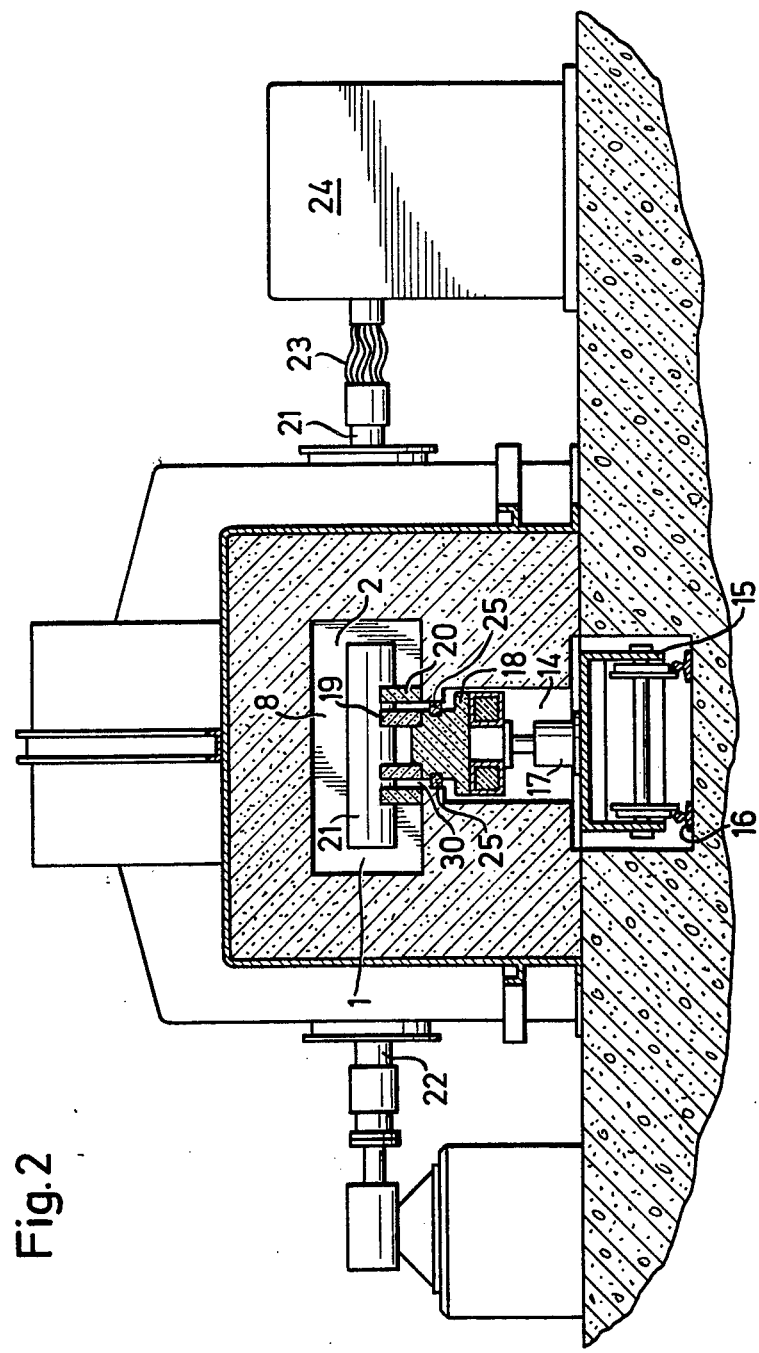

FIG. 2 is a section of the preheating zone, along line II—II of FIG. 1.

Figure 3:
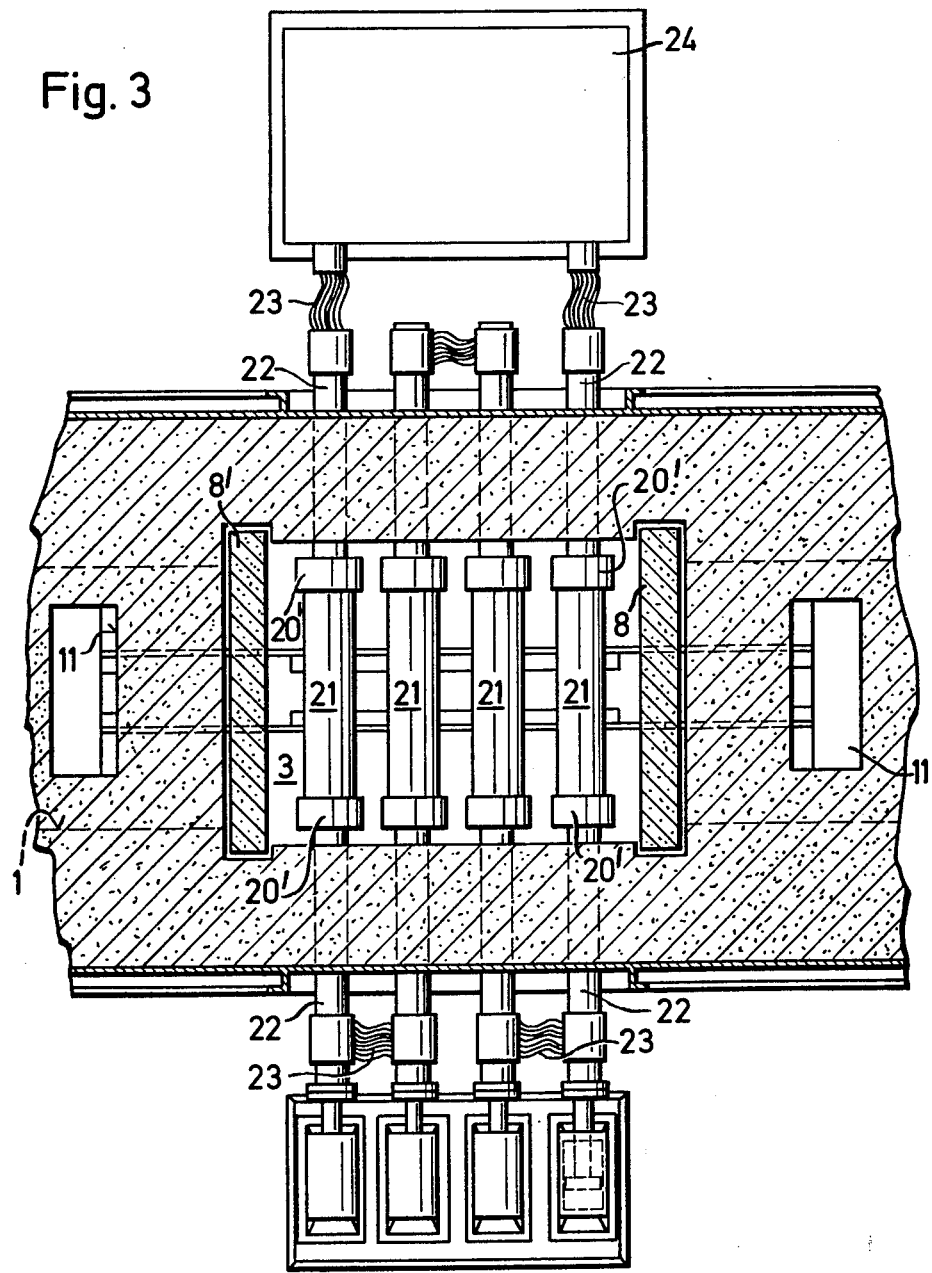

FIG. 3 is a section of the graphitizing zone along line III—III of FIG. 1.

Figure 4:
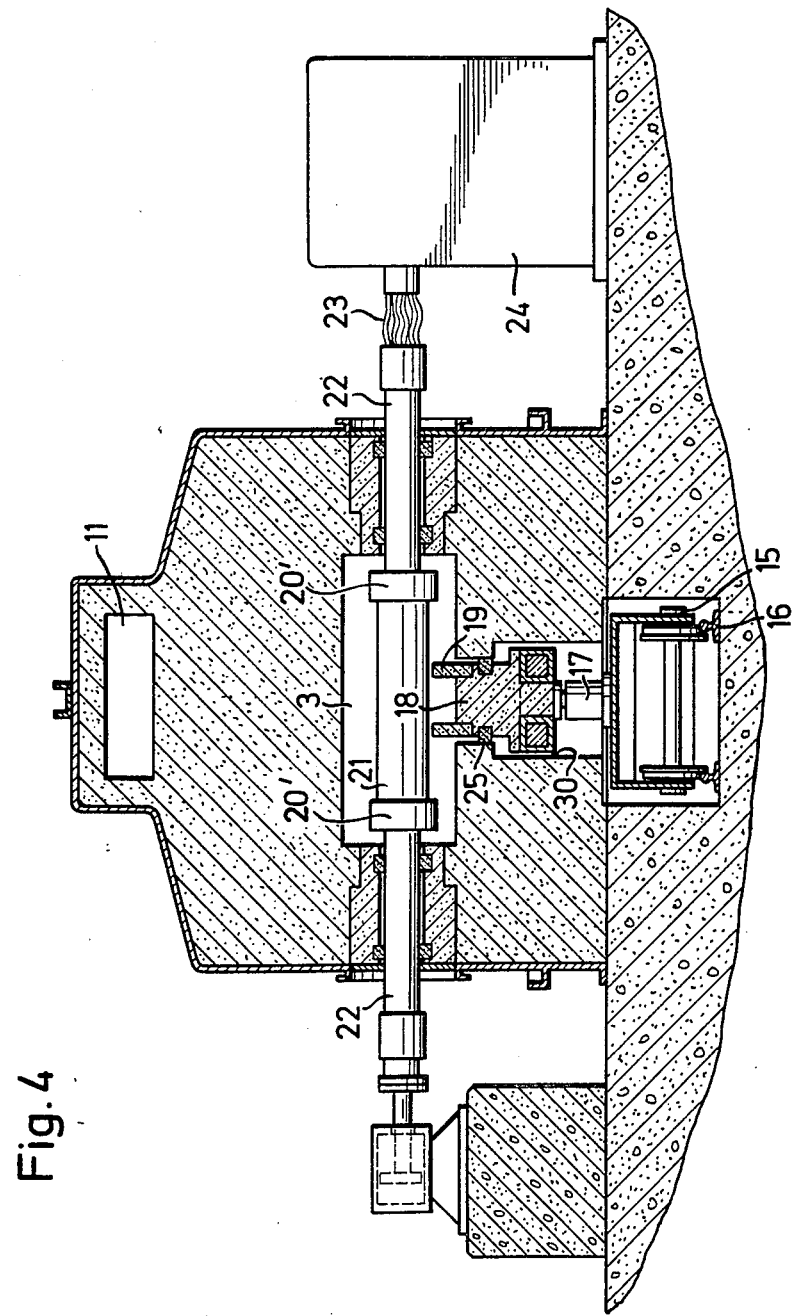

FIG. 4 is a section of the graphitizing zone along line IV—IV of FIG. 1.

Figure 5:
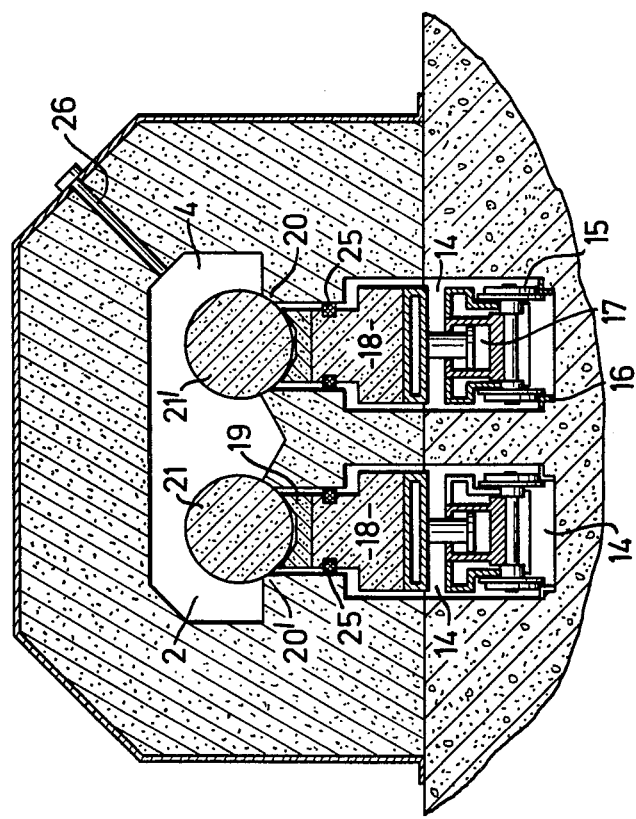

FIG. 5 is a graphitization furnace with parallel preheating and cooling zones.

Figure 6:
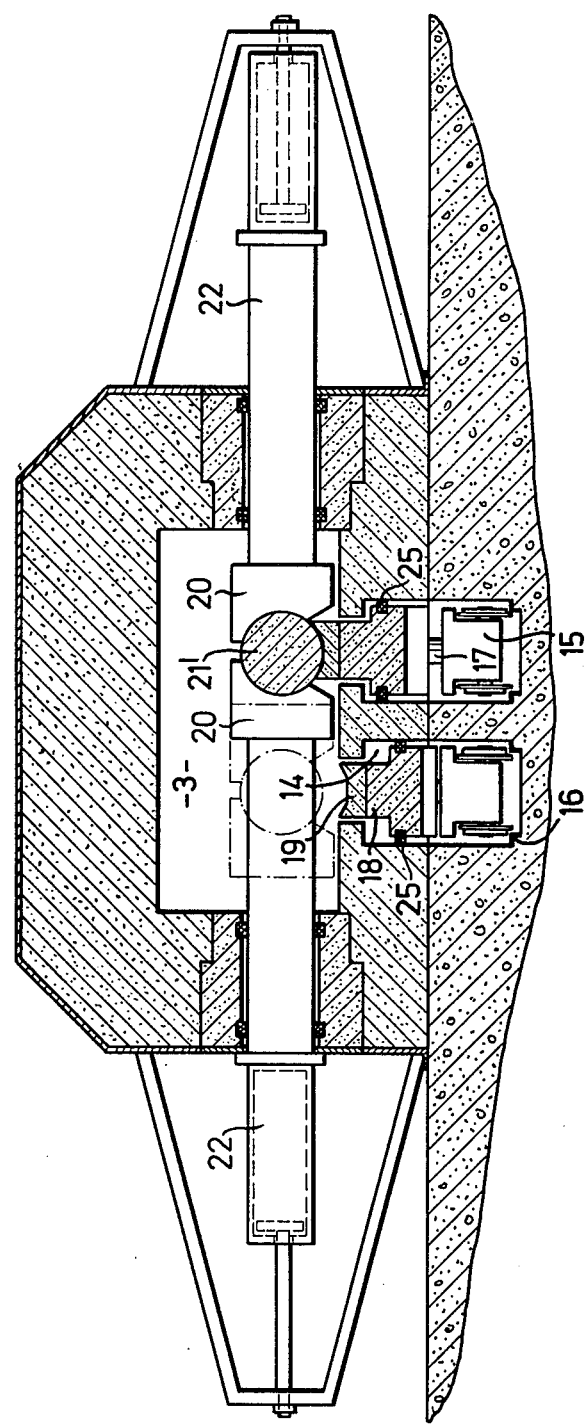

FIG. 6 is a cross section of the graphitizing zone of a furnace with parallel preheating and graphitization zones.

Figure 7:
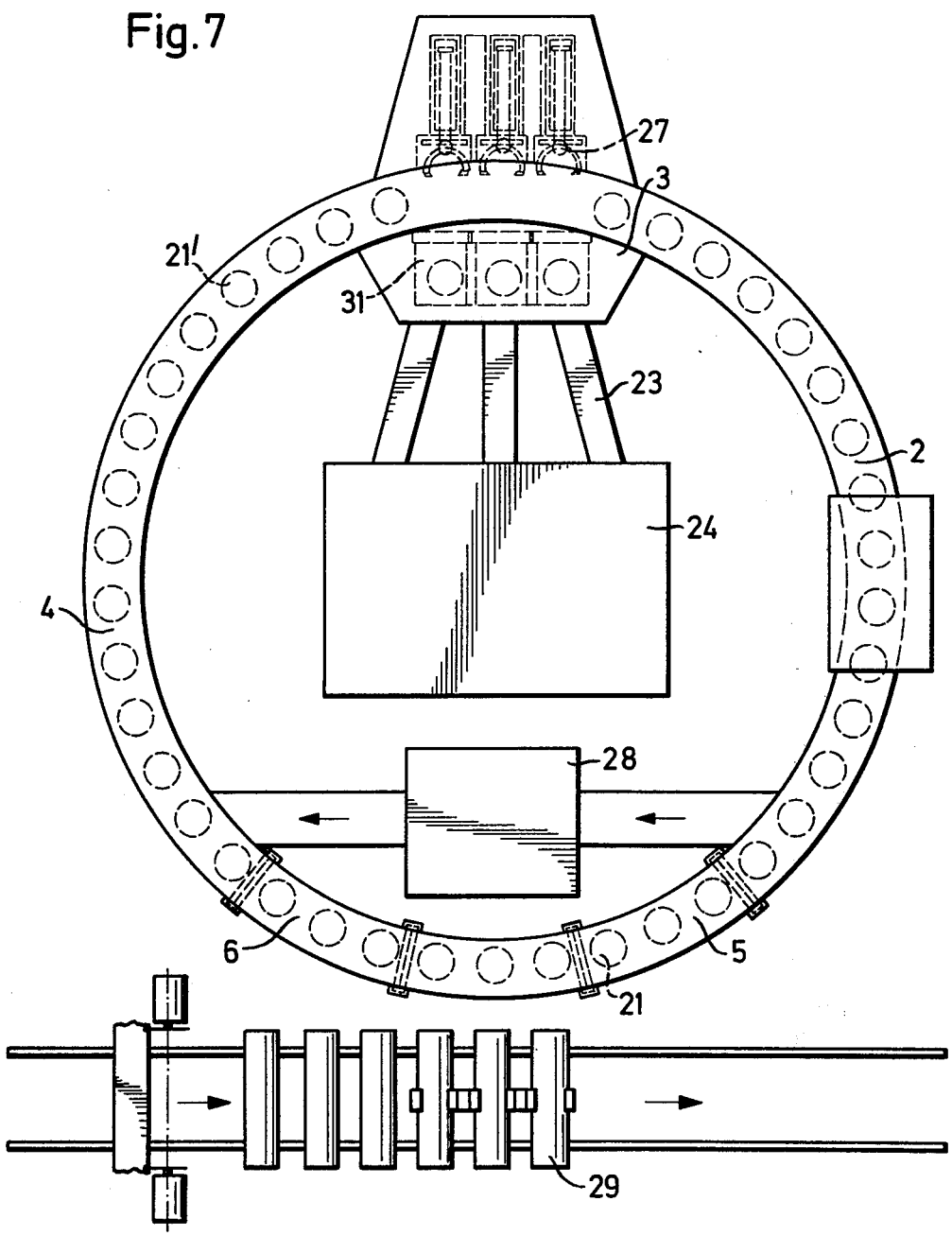

FIG. 7 is an annular graphitization furnace, shown in plan view.

DESCRIPTION OF THE INVENTION

The movement of the carbon bodies in the direction to the graphitization zone and of the graphite bodies in the cooling zone, is effected by members which are disposed outside of the furnace chamber and which reach into chamber through openings of the furnace wall, as for example, a lift and translation device.

The carbon body or the group of carbon bodies is first lifted to free them from the holding devices which are fixed to the furnace wall, then horizontally translated and, after a predetermined amount of translation, by lowering, again deposited on holding devices. This cycle is repeated several times from furnace entrance through the preheat, graphitization and cooling zone, to the furnace exit. The cycling times are determined by the required time to heat or cool the bodies to the respective zone temperatures. The gripping and holding devices are so constructed that the bodies are guided and thus controlled during the transport and the stationary phase. Particularly suited for holding devices, for example, are prisms made of a temperature resistant material, such as prisms of graphite. Suitable gripping devices are, for example, graphite prisms or tongs with gripping surfaces made of graphite. Since the graphite bodies and the members for transport do not touch the furnace wall, wear of the oven wall by mechanical friction is also avoided, as is a reduction of the furnace life by localized deformation.

A preferred transporting means is a series of carriages that are movable on rails disposed in a channel that extends under the furnace channel. The carriages are equipped with platforms or palettes that can move in a vertical direction, which palettes are placed in a slot-shaped opening between the furnace channel and the channel that houses the carriages. In order to move the carbon bodies, respectively, graphite bodies, the body or the group of bodies are first lifted from the holding devices which are arranged on one or several furnace walls, thereafter the carriage is moved to the adjacent holding devices and then the bodies are deposited by lowering the platform and gripper devices. Finally, the carriage returns to its starting position.

The energy required for the heating of the carbon bodies is usually only supplied to the graphitization zone and the excess heat of the same is used for preheating the bodies in the preheating zone. The graphitization zone is separated from the preheating zone and cooling zone by sliding members which are movable across the longitudinal axis of the furnace whereby heat losses can be reduced and, particularly, irregularities of the temperature profile that are detrimental to quality can be avoided. For heating of the carbon bodies, any heating devices are suitable that are resistant to the conditions of graphitization, for example, a resistance heating element made of graphite. It is preferred to heat the body by direct passage of current. Therefore, the holding devices in the graphitization zone which are connected to the furnace wall are made to serve as contact pieces and are electrically connected to a suitable current supply, such as a transformer or rectifier.

The electric circuits are closed by the carbon bodies deposited on the holding devices. To increase the operating voltage, several bodies can be connected in series by holding devices connected by current bridges. Advantages of direct resistance heating are mainly efficient energy use and less thermal loading of the masonry whose temperature remains considerably lower than the maximal temperature of the bodies. For regulation of a temperature gradient which makes the variable heating of the graphite bodies possible and it is independent of the heat conduction from the graphitization, one or several additional electrical heating elements can be provided in the preheating zone. Additional heating devices are particularly advantageous if it is not possible to heat up the carbon bodies quickly for reasons of quality or measuring purposes.

The continuous-type furnaces for carrying out the method of the instant invention can be constructed in annular ring-shaped form, for example, whereby in one section of the ring the carbon bodies are inserted and graphite bodies are discharged and the graphitization zone is disposed in the opposing section of the ring. In a linear embodiment of the continuous-type furnace, the various furnace zones — preheating, graphitization and cooling zones — are arranged in series or the cooling zone runs parallel to the preheating zone. The parallel arrangement makes a specially simple use of the heat energy which is carried from the graphitization zone by the graphite bodies, which energy is transferred, preferably by radiation, to the carbon bodies which are being moved towards the graphitization zone.

In any of the embodiments, furnace entry and exit are equipped with valves and devices for bringing in and out inert gas and to discharge combustion gases. The gas discharged at the entry-side is, after separating from the sulfur gas contents, for example sulfur dioxide, in a separator or washer, again fed into the exit side of the furnace. The liberation of noxious substances which in the known graphitization plants can only be avoided by a great technical effort, is completely eliminated by this arrangement of gas flow.

Those parts of the continuous-type furnace which are exposed to temperatures above approximately 1000° C, are generally made of graphite or carbon, in particular the walls and sliding members of the graphitization chamber, the holding devices which are connected to the furnace wall, the palettes of transportation carriages and the gripping devices. Preferably, the mentioned furnace parts are, in addition, isolated by layers of carbon felt and graphite sheets. The furnace, as a whole, is covered by a gas-tight open surface, cooled steel cover.

Referring to the drawings the furnace channel of the continuous-type furnace 1 shown in FIG. 1 to 4 illustrating one embodiment contains a preheating zone 2, a cooling zone 4 and a graphitization zone 3 which is separated from the preheating and cooling zones by means of graphite sliding members 8, 8'. At the ends of the furnace are lock chambers 5 and 6 into which respective chambers the carbon charge is introduced and the graphitized body is discharged. The lock chambers can be closed off from the furnace channel by sliding members 7, 7' and can be closed at the other ends by sliding members 9, 9'. An inert gas, for example nitrogen or argon, is introduced under pressure into lock chamber 6 through valved line 10 and flows through cooling zone 4, absorbing heat from the graphite bodies 21' by direct contact with them. The gas then passes through passageway or by-pass channels 11 above graphitization zone 3 and out of contact with the carbon bodies therein. The gas then flows to preheating zone 2, where the gas comes in direct contact with carbon bodies 21 and transfers to them the major part of the absorbed heat. If desired additional heating may be provided by an electrical heating element designated 2' and preferably made of graphite and suitably connected to an external source of electric current. The gas from preheating zone 2 is sucked out through channel 12 together with the gases such as sulfurdioxide and carbon monoxide formed in the graphitization zone 3. The pull of suction is usually adequate to cause the gas from zone 3 to pass through small openings between zone 3 and zone 2, but if necessary additional small openings may be provided. The gas from zone 2 is conducted to a purifier such as a washer, 51, wherein the impurities such as sulfur dioxide are removed by contact with a liquid medium e.g., $H_2SO_4$, or any suitable purification means. The purified gases are then returned to lock chamber 6. To avoid uncontrolled losses of returned gas, a small amount of inert gas may be introduced into lock chamber 5 through valve 13.

Arranged under the continuous-type furnace 1 is through-channel 14 which houses the carriages 15 which are movable on rails 16. The carriages have piston-like lifting devices 17 and platforms 18 which fit into slot 30 between furnace channel 1 and the other channel 14 (FIG. 2). The platforms 18 have gripping devices 19 which are notched or prism-shaped and into which the carbon bodies 21 are received and secured. The holding devices 20 which may also be notched or prism-shaped are in fixed connection with the furnace wall in preheating zone 2 and cooling zone 4. The overlapping of platforms 18 and their close fit in slot 30 result in shielding of channel 14 from heat transfer by radiation or convection. Heat transferred by conduction is taken away by cooling with a water spray, not shown.

The holding devices 20' in graphitization zone 3 (FIG. 3 and FIG. 4) are screwed to water cooled pistons 22 which are electrically connected by cables 23 with electric current supply 24. The packings of graphite foil 25 which are disposed in recesses of the platforms 18 serve for better thermal shielding of channel 14 under the graphitization zone. To insure good contact and avoid electric contact losses, the holding devices 20' which also serve as contact pieces, are pressed against the end faces of the carbon bodies 21 during the graphitization process, and possible changes of length carbon body 21 during the conversion from carbon to graphite are compensated by motion of the pistons 22. The time to heat up either a single carbon body or in series-connected carbon bodies depends mainly on their cross section and is usually 0.5 – 4 hours at a maximum temperature of approximately 2900° C. After the graphitization is finished and after the current supply devices are disconnected, the carbon, respectively, graphite bodies are lifted from the holding devices 20 by raising the platforms and holding devices and the sliding members 7, 7', 8, 8' and 9' are opened. Thereafter, carriages 15 move a distance equal to the length of one platform 18 in the direction of the furnace exit, platforms 18 and gripping devices 19 are lowered, and the carbon, respectively, graphite bodies are deposited on the holding devices 20. The carriages 15 are retracted by the distance of one platform length and the sliding members are closed. In each cycle, the load of one platform is discharged from the furnace and one platform in the entrance chamber is reloaded. To insure adequate time in the cooling zone 4 and preheating zone 2, more than one platform may be included in each zone. In FIG. 1 two platforms are shown. Now, the cycle starts again, wherein the carbon bodies are heated by the hot inert gas in the preheating zone from room temperature to approximately 1300° to 1400° C and the graphite bodies in the cooling zone are cooled by the cold inert gas to approximately 300° – 500° C. Depending on the size of the carbon bodies, the energy requirement is approximately 50% – 60% of that of an Acheson-furnace of equivalent output.

FIGS. 5 and 6 illustrate another embodiment in which a graphitization furnace is shown with two channels 14 which extend under the furnace channel. In one channel beneath the preheating zone 2 are disposed a series of carriages equipped with platforms 18 for the transport of the carbon bodies 21 to the graphitization zone 3 and in the second parallel channel, the cooling zone 4, identical carriages are arranged for the transport of the graphite bodies 21' to the furnace exit. The carbon and graphite bodies are supported on the holding devices 20, between cycles, and during motion, they are held by the gripper devices 19. Heat is directly exchanged by radiation between the preheating zone and the cooling zone, so that, at the entrance of the graphitization zone, temperatures of approximately 2000° C are reached. The thermocouple elements and pyrometer 26 serve for control of the temperatures and cycling times.

At the end of the graphitization process, in the graphitization zone 3, the completely graphitized graphite body which is held in holding device 20' is moved by the piston mechanism 22 translated to the position adjacent to the cooling zone. Thereafter, all carbon and graphite bodies are lifted from the holding devices by raising the platforms and gripping devices and translated one platform length towards, respectively, away from the graphitization zone. After lowering of the platforms and gripping devices, the carriages return to the starting position and the cycle starts again.

An especially advantageous thermal efficiency is effected in graphitization furnaces which contain three parallel furnace and transport channels, whereby the preheating channel is disposed between two parallel cooling channels. In furnaces of this type, it is necessary to provide suitable carriages that can move across to the longitudinal furnace axis for moving the carbon-graphite bodies crosswise.

A further embodiment is an annular graphitization furnace as shown in FIG. 7. The carbon bodies 21 which are inserted into the entrance lock chamber 5 by means of the loading and discharge mechanism 29, are cyclically transported through the preheating zone 2 into the graphitization zone 3 and there, by means of the loading machine 27, transferred into the graphitization chamber 31 which is disposed adjacent to the annular channel. The heating up to the graphitization temperature, is effected by direct passage of current. A transformer 24 and the bus bars 23 which are electrically connected to the holding devices are located inside of the annulus. After completed graphitization, the bodies are redeposited in the annular channel and cyclically moved through the cooling zone 4 into the discharge chamber 6. The inert gas that is used for preheating of the carbon bodies and cooling of the graphite bodies is moved, by ventilator 28, in counterflow through the annular channel.

There is claimed:

1. Method for graphitization of carbon bodies in a continuous-type furnace which comprises transporting a charge of carbon containing at least one carbon body to be graphitized into a preheating zone of said furnace wherein said charge of carbon is retained by a holding device in said preheating zone and passing a hot inert gas in contact with said carbon charge, transporting said preheated carbon to a graphitization zone in said furnace wherein said preheated carbon is retained in said graphitization zone by a holding device in said zone and heating said preheated carbon by electrical heating means up to a temperature above 2200° C in said graphitization zone to effect graphitization of preheated carbon, transporting said graphitized carbon to a cooling zone in said furnace wherein said graphitized carbon is retained in said cooling zone by a holding device in said zone and cooled in said cooling zone to a temperature below about 500° C, said preheating, graphitization and cooling of said carbon body constituting a cycle of operation, simultaneously subjecting in furnace a carbon charge to preheating, another previously preheated carbon body to graphitization, and a third previously preheated and graphitized carbon body to cooling, and after each cycle removing the cooled graphite body from the holding device in the cooling zone and transporting it out of the cooling zone, removing the graphitized body from the holding device in the graphitizing zone and transporting it to the cooling zone, removing the preheated carbon from the holding device in the preheating zone and transporting it to the graphitizing zone, transporting a new charge of carbon into the preheating zone, and continuing the simultaneous preheating, graphitization and cooling of three different carbon charges and between cycles moving the carbon bodies from the holding devices and transporting the graphite carbon out of the cooling zone, transporting the graphitized carbon to the cooling zone, transporting the preheated carbon to the graphitization zone, and transporting a new charge to the preheating zone.

2. Method of graphitizing carbon bodies in a continuous-type furnace which comprises preheating a cyclical flow of groups of carbon bodies, respectively, consisting of at least one carbon body, counter to a flow of hot inert gas, heating the groups of carbon bodies in a graphetizing zone electrically heated to a temperature above 2200° C, cooling the heated groups of carbon bodies, respectively, in a cooling zone to a temperature below 500° C, and wherein in the graphitization zone each carbon body therein is held by two holding members which are connected electrically with a source of electric current thereby heating said carbon body.

3. Method according to claim 2 including passing a cool inert gas in direct contact with the graphitized carbon in the cooling zone countercurrent to the direction of transportation of said graphitized carbon, then passing the heated gas from the cooling zone through a passageway in said graphitization zone out of contact with the carbon body therein, and then passing the hot inert gas from the graphitization zone into said preheating zone in direct contact with the carbon charge in the preheating zone countercurrent to the direction of transport of said carbon charge thereby preheating said carbon charge.

4. Method according to claim 3 including discharging gas from said preheatng zone, removing gaseous sulfur compounds as impurities from said discharged gas, and returning the purified gas to the cooling zone.

5. A continuous-type furnace for graphitization of carbon bodies comprising a channel in said furnace through which a carbon body for graphitization may pass consecutively through a preheating zone, a graphitization zone and a cooling zone, holding means in each said zones for retaining carbon bodies in said zones, means for preheating said carbon body in said preheating zone, electrical heating means in said graphitization zone for graphitizing said carbon body, cooling means in said cooling zone for cooling said graphitized body, slot-shaped openings in said furnace, gripping devices extending through said slot-shaped openings into said zones in said furnace channel for gripping said carbon bodies in said zones and extending outside said channel, means connected to said gripping devices outside said channel to move the carbon bodies in said zones in horizontal and vertical directions.

6. Continuous-type furnace according to claim 5 including a second channel disposed under said furnace channel which second channel is connected with the furnace channel by a slot which extends along the entire length of the furnace, said second channel containing a series of carriages which move on rails and platforms and gripping devices which are movable in the vertical direction, the platforms disposed above the carriages in the slot between the furnace channel and the second channel, said platforms substantially sealing the second channel from the furnace channel, gripping members above said platforms extending into said furnace channel for firmly holding said carbon bodies, and means for moving said platforms and gripping members in a vertical direction.

7. Continuous-type furnace according to claim 5 wherein the holding devices in the graphitization zone are attached to the furnace wall and are fashioned as contact pieces which are connected to a source of electrical current.

8. Continuous-type furnace according to claim 5 wherein the preheating zone and cooling zone are arranged parallel to each other.

9. Continuous-type furnace according to claim 5 wherein the preheating zone contains at least one electric heating device.

10. Continuous-type furnace according to claim 6 wherein the furnace walls in the graphitization zone are isolated by carbon felt and graphite foil.

11. Continuous-type furnace according to claim 5 wherein said graphitization zone may be closed by movable graphite members which slide crosswise to the transport direction of the carbon bodies.

12. Continuous-type furnace according to claim 5 wherein said cooling zone has an inlet opening for the introduction of cool inert gas in direct contact with the carbon bodies therein, an outlet opening for the discharge of the thus heated inert gas from the cooling zone into the graphitization zone, a passageway in said graphitization through which said gas passes out of contact with the carbon bodies therein, an outlet opening in said graphitization zone for the discharge of said gas into said preheating zone wherein it passes in direct contact with the carbon bodies therein, and an outlet opening in said preheating zone for the discharge of said gas.

* * * * *